United States Patent
Girard et al.

(10) Patent No.: US 7,833,374 B2
(45) Date of Patent: Nov. 16, 2010

(54) RADIALLY EXPANSIBLE TIRE ASSEMBLY DRUM AND METHOD FOR FORMING TIRES

(75) Inventors: Jean-Claude Girard, Copley, OH (US); Andres Ignacio Delgado, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 512 days.

(21) Appl. No.: 11/256,009

(22) Filed: Oct. 21, 2005

(65) Prior Publication Data

US 2006/0032576 A1 Feb. 16, 2006

Related U.S. Application Data

(63) Continuation-in-part of application No. 10/388,773, filed on Mar. 14, 2003, now abandoned.

(51) Int. Cl.
*B29D 30/16* (2006.01)
(52) U.S. Cl. .................. 156/130; 156/123; 156/133
(58) Field of Classification Search ............. 156/117, 156/126, 127, 130, 132, 406.2, 415, 416, 156/396, 111
See application file for complete search history.

(56) References Cited

U.S. PATENT DOCUMENTS

| 1,179,898 | A | | 4/1916 | Coffey et al. | |
|---|---|---|---|---|---|
| 1,388,255 | A | | 8/1921 | Hardeman | |
| 3,276,930 | A | * | 10/1966 | Keefe, Jr. | 156/130 |
| 3,560,302 | A | | 2/1971 | Missioux | 156/415 |
| 3,607,558 | A | | 9/1971 | Nebout | 156/415 |
| 3,684,621 | A | | 8/1972 | Frazier et al. | 156/401 |
| 3,713,929 | A | * | 1/1973 | Bottasso et al. | 156/127 |
| 3,767,509 | A | | 10/1973 | Gazuit | 146/415 |
| 3,833,445 | A | | 9/1974 | Mallory et al. | 156/401 |
| 3,868,203 | A | | 2/1975 | Turk | 425/242 |
| 4,007,080 | A | | 2/1977 | Klöpper | 156/396 |
| 4,043,725 | A | | 8/1977 | Schmidt | 425/542 |
| 4,045,277 | A | | 8/1977 | Habert et al. | 156/417 |
| 4,211,592 | A | | 7/1980 | Grawey | 156/123 |
| 4,738,738 | A | * | 4/1988 | Holroyd et al. | 156/129 |
| 5,201,975 | A | | 4/1993 | Holroyd et al. | 156/124 |
| 5,320,695 | A | * | 6/1994 | Siegenthaler | 156/127 |
| 5,853,526 | A | | 12/1998 | Laurent et al. | 156/396 |

(Continued)

FOREIGN PATENT DOCUMENTS

DE 2002294 7/1971

(Continued)

OTHER PUBLICATIONS

European Search Report, completed Jan. 22, 2007.

*Primary Examiner*—Geoffrey L Knable
(74) *Attorney, Agent, or Firm*—Richard B. O'Planick

(57) ABSTRACT

A method of building a tire carcass onto a toroidally expanded building drum core is disclosed which comprises: transferring a breaker and tread package to a mold; loading the tire carcass at diameter D1 into the mold; toroidally expanding the tire carcass to a second diameter D2 wherein the tire carcass and the breaker and tread package form an uncured tire assembly; curing the uncured tire assembly to form a cured tire in the mold; and removing the cured tire from the mold.

5 Claims, 8 Drawing Sheets

U.S. PATENT DOCUMENTS

| | | |
|---|---|---|
| 6,234,227 B1 | 5/2001 | Bosseaux .................... 156/398 |
| 6,250,356 B1 | 6/2001 | Cordaillat et al. ........... 156/400 |
| 6,318,432 B1 | 11/2001 | Caretta et al. ............... 152/552 |
| 6,406,575 B1 | 6/2002 | Baumgarten et al. .......... 156/96 |
| 2002/0174939 A1* | 11/2002 | Caretta et al. ............... 156/118 |
| 2004/0177914 A1* | 9/2004 | Girard et al. ................ 156/133 |
| 2005/0000624 A1* | 1/2005 | Tokunaga ................... 156/111 |

FOREIGN PATENT DOCUMENTS

| | | |
|---|---|---|
| EP | 0 299 904 A1 | 1/1989 |
| EP | 0 381 659 A2 | 8/1990 |
| EP | 0 505 813 A1 | 9/1992 |
| EP | 0 661 150 A2 | 7/1995 |
| EP | 1 457 309 A1 | 9/2004 |
| GB | 1 471 547 | 4/1977 |
| GB | 1524369 | 9/1978 |
| JP | 2003-071950 A * | 3/2003 |
| WO | 03103935 | 12/2003 |

* cited by examiner

US 7,833,374 B2

RADIALLY EXPANSIBLE TIRE ASSEMBLY DRUM AND METHOD FOR FORMING TIRES

This application is a continuation-in-part of Ser. No. 10/388,773 filed Mar. 14, 2003, now abandoned which is fully incorporated herein by reference.

FIELD OF THE INVENTION

This invention relates to an improved radially expansible tire assembly drum and a method for forming tires from an assemblage of tire components utilizing the assembly drum.

BACKGROUND OF THE INVENTION

Historically, the pneumatic tire has been fabricated as laminated structure of generally toroidal shape having beads, a tread, a belt reinforcement and carcass. The tire is made of rubber, fabric, and steel. The manufacturing technologies employed for the most part involve assembling the many tire components from flat strips or sheets of material. Each component is placed on a building drum and cut to length such that the ends of a component meet, or overlap, creating a splice.

In the first stage of assembly, the carcass would include one or more plies, and a pair of sidewalls, a pair of apexes, an inner liner (for a tubeless tire), a pair of chafers and perhaps a pair of gum shoulder strips. Annular bead cores can be added during the first stage of tire building, and the ply or plies can be turned around the bead cores to form the "ply turnups."

Typically, the carcass components (excluding the bead cores) would be either "butt spliced" or "lap spliced." A butt splice has the component ends joined, but not overlapped. A lap splice has overlapping ends.

This intermediate article of manufacture can be cylindrically formed at this point in the first stage of assembly. The cylindrical carcass is expanded into a toroidal shape after completion of the first-stage of tire building. Reinforcing belts and the tread are added to the intermediate article during a second stage of tire manufacture, which can occur using the same building drum or work station or at a separate shaping station.

During the expansion of the carcass, tensile stresses are imposed on the spliced and uncured components of the tire carcass.

In the case of automobile or light truck tires, lap splices were preferred because the splice remained intact, whereas butt splices would tend to open or fail. Even with the good adhesion of the lap splice, the cords adjacent the splice tended to be stretched compensating for the overlapped two layers of cords at the splice. This localized stretching creates a non-uniformity that is readily visible under x-ray, ultrasonic display or by physically cutting the tire and visually inspecting it.

The tire designer, in order to prevent the creation of tire uniformity problems, has historically insured that the splices of various layers of components were not circumferentially aligned. This non-alignment of splice joints was believed to improve the carcass overall durability and uniformity, as measured by the amount of force variation and the balance of the tire. Tire engineers also have believed that tire uniformity could be improved if these discontinuities were deliberately circumferentially spaced around the carcass. This meant that each component had to be applied to the ply at the tire building station where each component was cut and spliced in a spaced order.

When the cord reinforced plies are placed on the building drum, it is very important that the geometric spacing of the beads and the ply turnups are controlled uniformly. Variations in the overall tire building process can result in variations in cord tension. These non-uniformities can affect the ride and handling characteristics of the tire.

In U.S. Pat. No. 6,250,356 to Michelin, a tire assembly drum is disclosed wherein the beads are two distinct sizes. Conventionally, tires are symmetrical having equal bead diameters. The two distinct diameters on a tire exacerbate the problems of tire building and the disclosed assembly drum provides a method and apparatus to permit the tire to be built in a more uniform and faster way. This building drum was designed to build tires having a given set of two different diameters at the first stage of assembly. A separate tire-shaping drum was used to toroidially shape the tire carcass to assemble the tread and belt reinforcements and that drum is disclosed in U.S. Pat. No. 6,234,227.

A conventional prior art approach for the forming of a tire is illustrated in a block level diagram FIG. 7 for the purpose of illustration. In conventional tire forming methods, a drum is collapsed 160 to a D0 diameter and chafer, inner liner, and ply layers are applied. The drum is thereafter expanded 162 to a first diameter D1 and the carcass is completed on the drum by the application of the bead, ply turn up and apply sidewall. The drum is then further expanded 164 to a second diameter D2 and the green tires is thereafter completed on the drum at diameter D2 by the application of breakers and tread components. The drum is then collapsed 166 to its initial diameter D0 and the green tire is removed from the drum. The green tire is loaded 168 into a mold at a press, and a bladder is used to expand the green tire into the mold 168 to a third diameter, D3. The green tire is then cured at the D3 diameter and removed from the mold 170. D3 represents the final diameter of the finished tire.

It will be appreciated that the prior art method of changing the drum diameters from D0 through expanded diameters D1 and D2 in order to arrive at a finished tire diameter D3 acts to exaggerate any imperfections in the tire caused by imperfectly dimensioned tire component layers and/or imperfections caused by uneven drum expansion. The prior art method of FIG. 7 is, to a greater than desired extent, uncontrolled as a result of variables in the carcass layer geometries and the less than perfect control over the expansion of the drum by the press bladder indicated at block 68. Consequently, the prior art methodology may result in a finished tire having less than desired quality and uniformity.

SUMMARY OF THE INVENTION

A method of building a tire carcass onto a toroidially expanded building drum core is disclosed which comprises the steps of applying the carcass components onto a cover of the toroidially expanded building drum core at a first diameter $D_1$ while rigidly supporting the sides of the cover with a pair of internal side support mechanisms to form a toroidially shaped uncured carcass.

The method of building a tire carcass onto a toroidially expanded building drum core further may employ the steps of: expanding the cover radially by an amount less than 5% greater than the diameter $D_1$ and applying a belt reinforcing structure or a tread and belt reinforcing structure onto the expanded cover to form an uncured tire assembly and may further include the step of curing the uncured tire assembly in a tire curing mold and removing the cured tire assembly from the mold; collapsing the toroidially expanded building drum core; and removing the tire from the collapsed core.

Alternatively, the method may involve the steps of collapsing the radially expanded building drum core; and removing the formed uncured carcass from the collapsed building core without utilizing the building drum core in the tire curing mold.

Another alternative method of employing the present invention includes building the carcass while the cover is on the toroidially expanded building drum core at the diameter $D_1$, inserting an annular tread belt in a tire curing mold along with the assembled carcass on the building drum core to form a tire and then inflating the cover to a diameter $D_1$ plus less than 5% and curing the tire.

The method of building a tire carcass onto a toroidially expanded building drum core has the step of collapsing the radially expanded core including the steps of axially increasing the spacing between the rigidly supported sides and radially lowering the internal side support mechanisms.

The step of lowering the internal side support mechanisms includes the steps of pivotally moving hinged elements of the internal side support mechanisms radially and axially inwardly.

The above method is best performed by a tire building drum rotatable about an axis of rotation.

The tire building drum has a pair of annular axially movable end supports; a pair of collapsible annular sidewall supports, an expandable reinforced annular cover, a means for rotating the tire building drum and a means for axially moving the annular axially movable end supports.

The pair of collapsible annular sidewall supports has a support attached pivotably to each axially movable end support. Each collapsible annular sidewall support has a plurality of pivotably movable hinged elements. The plurality of hinged elements when extended radially forms a collapsible annular sidewall support.

The expandable reinforced annular cover traverses across and extends over each collapsible sidewall support.

Pursuant to a further aspect of the invention, the subject method of utilizing a radially expansible tire assembly drum in the construction of a tire comprises: expanding a tire building drum from an initial D0 diameter to a first diameter D1; building a carcass on the core to a final dimension; expanding a breaker and tread drum to a second diameter D2; applying a breaker and tread package to the breaker and tread drum at the second diameter D2; loading the breaker and tread drum with the breaker and tread package into a mold; closing the mold on the breaker and tread drum; collapsing and removing the breaker and tread drum; transferring the breaker and tread package to the mold; loading the core at the first diameter D1 into the mold; expanding the core to the D2 second diameter; curing the tire; removing the core with the cured tire from the mold; collapsing the core to the DO diameter; and removing the cured tire from the core.

DEFINITIONS

"Apex" means an elastomeric filler located radially above the bead and interposed between the plies and the ply turnup.

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Shoulder" means the upper portion of sidewall just below the tread edge.

"Sidewall" means that portion of a tire between the tread and the bead.

"Subassembly" means an unvulcanized assembly of laminated tire components to which a cord reinforced ply or plies and other components can be added to form a tire carcass.

"Tread" means a rubber component which, when bonded to a tire carcass, includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE ILLUSTRATIVE EMBODIMENTS

Figure 1:
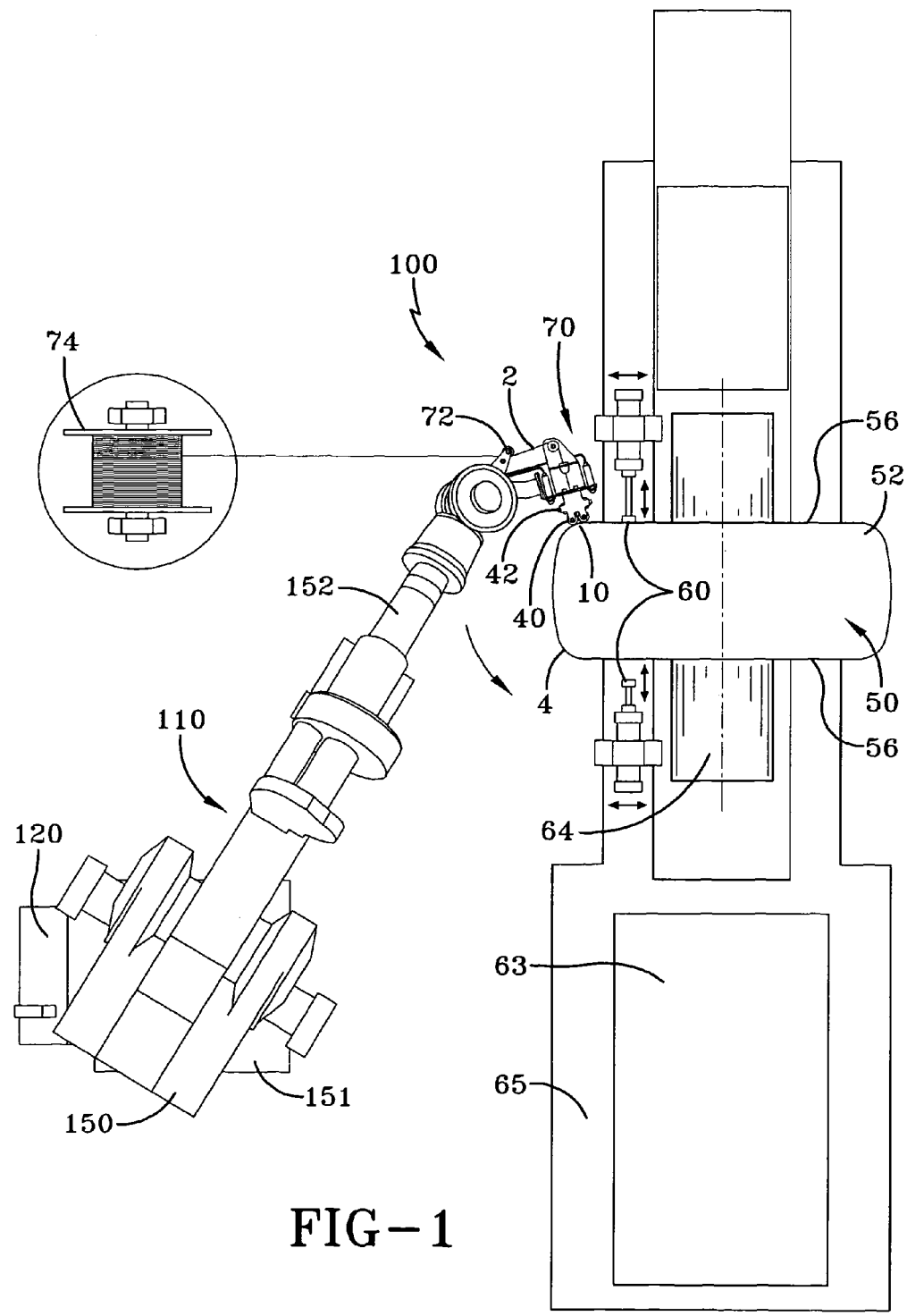
FIG. 1 is a plan view of the radially expansible drum assembly according to the present invention shown in combination with a robotic mechanism for applying ply cords.

With reference to FIG. 1, a plan view of the tire building apparatus 100 of the present invention is illustrated. As shown, the apparatus 100 has a guide means which has, in addition to the ply mechanism 70, a robotic computer controlled system 110 for placing the cord 2 into the toroidially expanded surface of a building drum 50. A means for applying an elastomeric layer 4 onto the expanded cover 52 is provided which can include a server mechanism to feed strips of the layer 4 to the expanded cover 52.

The robotic computer controlled system 110 has a computer 120 and preprogrammed software which dictates the ply path 10 to be used for a particular tire size. Each movement of the system 110 can be articulated with very precise movements.

The robot 150 which is mounted on a pedestal 151 has a robotic arm 152 which can be moved in preferably six axes. The manipulating arm 152 has the ply mechanism 70 attached as shown.

Loop end forming mechanisms 60 are positioned on each side 56 of the toroidially expanded cover 52. The robotic arm 152 feeds the ply cord 2 in predetermined paths 10 and the loop end forming mechanism 60 holds the cord 2 in place as a looped end is formed. Each time an end is formed the toroidially expanded cover 52 is rotated to index to the next pitch P and the adjacent ply path 10 around the toroidially expanded cover 52.

The movement of the ply mechanism 70 permits convex curvatures to be coupled to concave curvatures near the bead areas thus mimicking the as-molded shape of the tire. A means 63 for rotating the mandrel 52 about its axle 64 are all mounted to a rigid frame 65 as shown.

Figure 5:
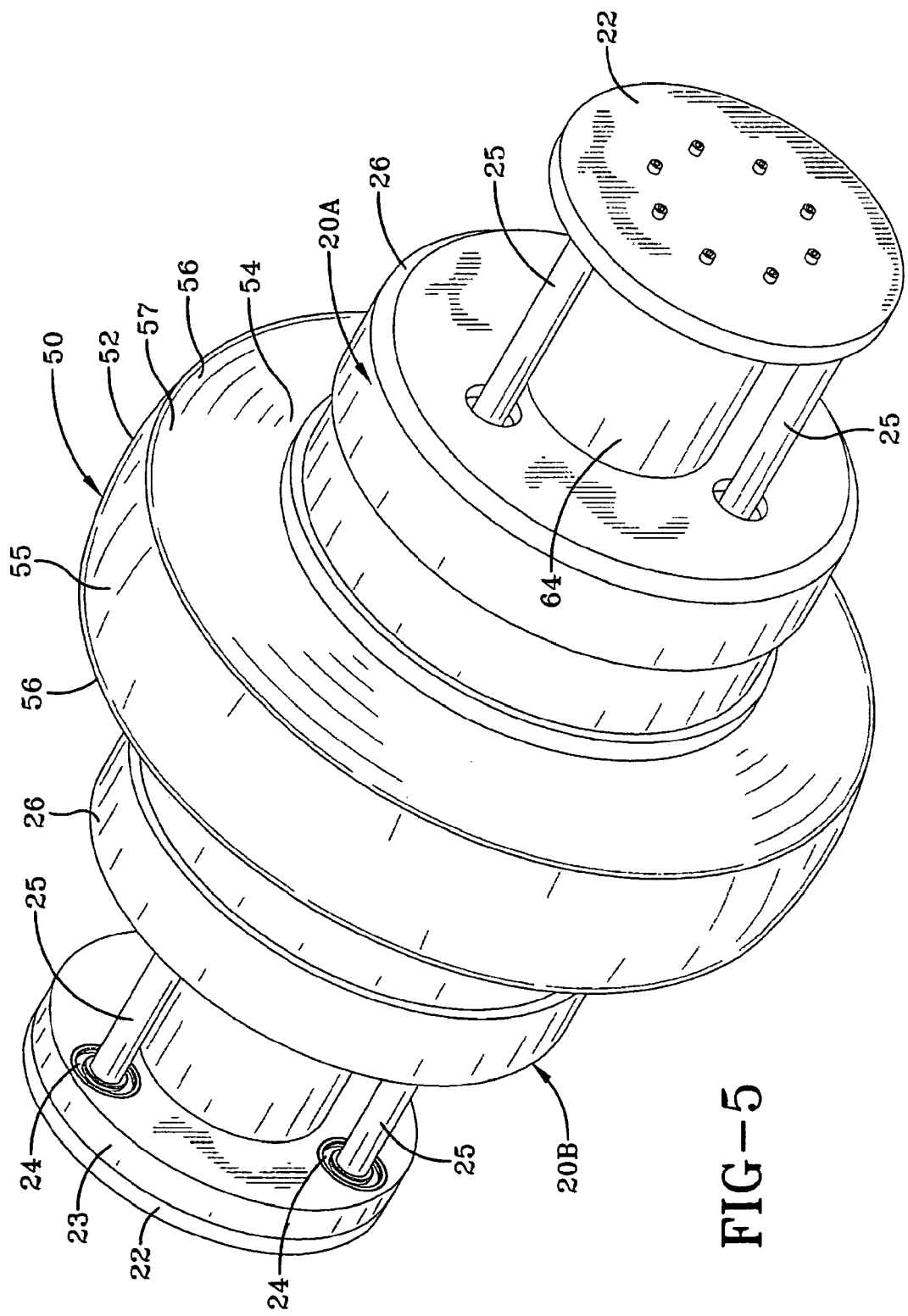
FIG. 5 is a perspective view of the fully extended drum core assembly illustrating the expandable reinforced annular cover in the fully extended position.

With reference to FIG. 5, a perspective view of the toroidially expandable reinforced cover 52 of the present invention is shown. As illustrated, the radially inner portions 54 on each side 56 of the toroidially expandable cover 52 have a concave curvature that extends radially outward toward the crown area 55 of the toroidal mandrel 52. As the concave cross section extends radially outward toward the upper sidewall portion 57, the curvature transitions to a convex curvature in what is otherwise known as the crown area 55 of the toroidially expandable cover 52. This cross section very closely duplicates the as-molded cross section of a tire.

The entire drum core assembly 50 is shown in detail in FIGS. 2 through 6. In each of these figures the sequence of operation is shown from the perspective view of the drum core assembly 50.

Figure 2:
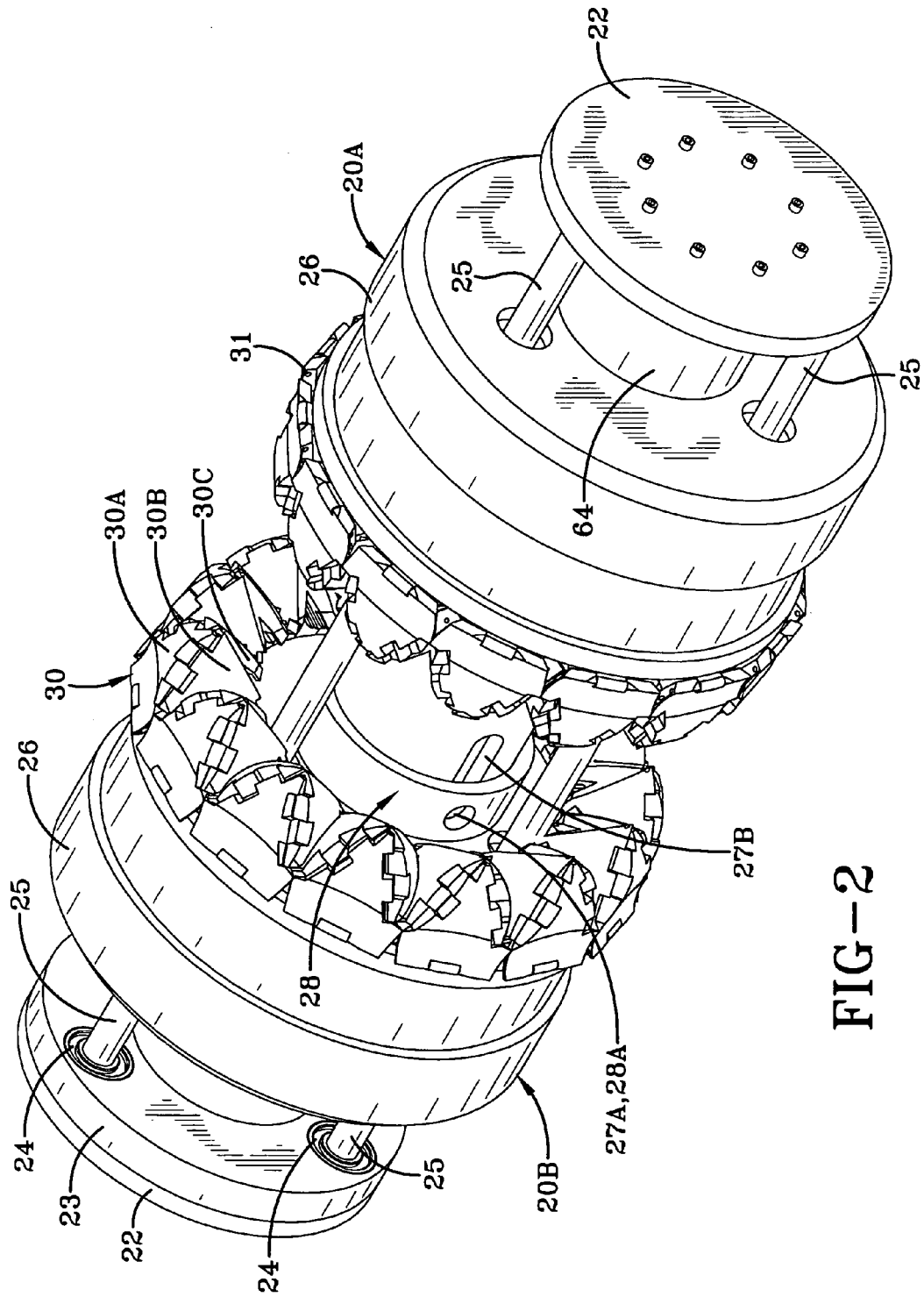
FIG. 2 is a perspective view of the radially expansible drum assembly illustrating the drum core assembly shown in a closed position with the expandable cover removed for clarity of the internal mechanisms.

With particular reference to FIG. 2 the drum core assembly 50 has a pair of end plates 22. These end plates provide attachment points for the entire drum core assembly to the tire building machine. The end plates 22 have four shafts connected to each plate. These shafts 25 extend throughout the drum core assembly and, as illustrated, various components are slidably attached to these shafts 25. For example, a disk 23 is shown at one end of the drum assembly. That disk has bearings 24 attached to each shaft. The disk is slidably movable along the shaft.

The drum core assembly 50 includes a pair of annular axially movable end supports 26. Attached to the end supports 26 is a pair of collapsible annular sidewall supports 30. A ring 28 is illustrated that is mounted over the axle 64. The ring has an opening 27a that provides for a cam follower 28a to ride in a slot 27b on the axle 64. This movement of the ring 28 provides axial movement inward and outward. The movement of the ring 28 is connected to the axially movable support ends 26 on each side of the drum assembly as illustrated. In FIG. 2 the drum assembly is shown without the reinforced annular cover 52 for better understanding of how the underlying mechanisms actually operate. As shown in FIG. 2, the collapsible annular side supports 30 are shown in the fully retracted or inward position. In this position the end supports 26 are axially spaced at their furthest distance apart.

Figure 3:
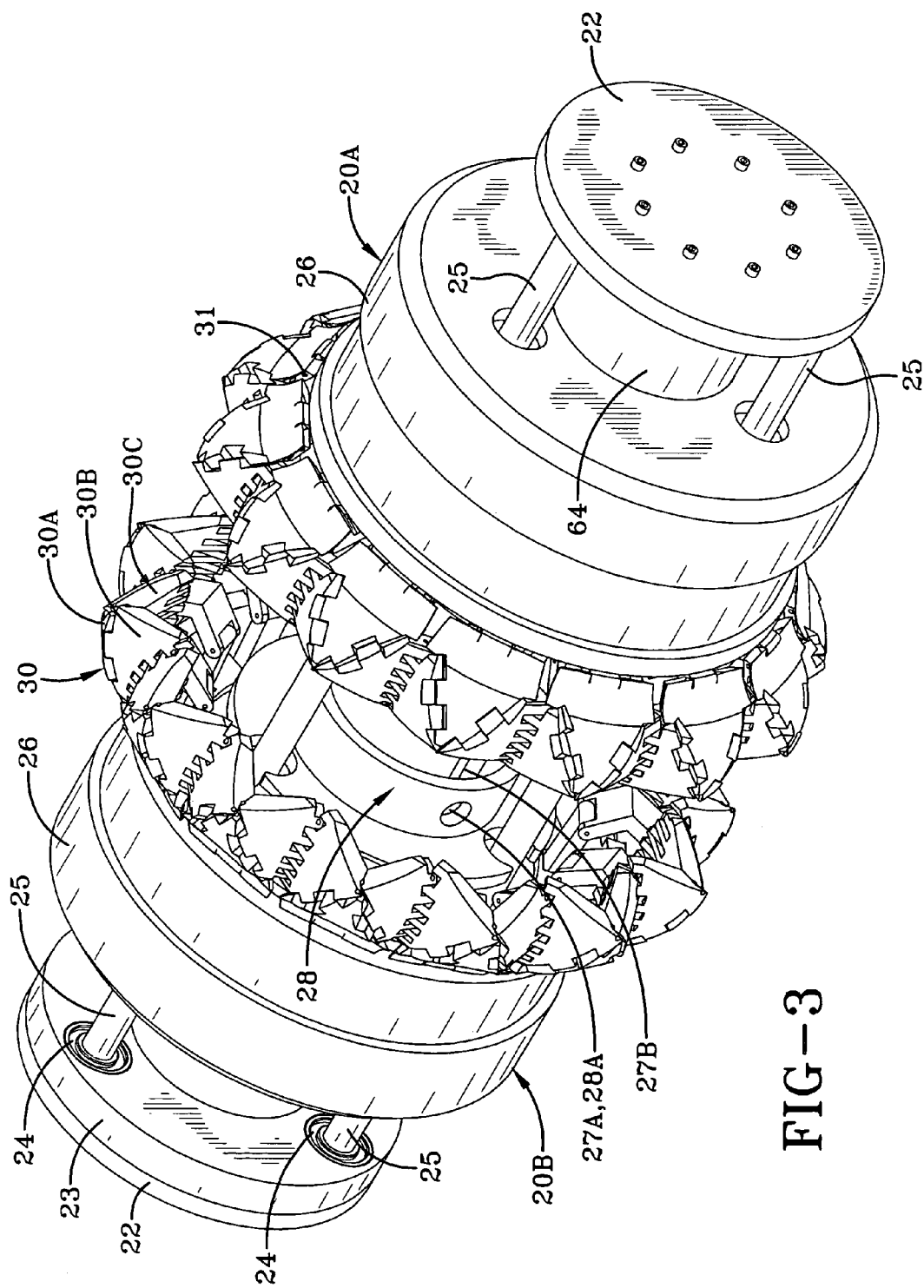
FIG. 3 is a second perspective view of the drum core assembly partially expanded illustrating the initial movement of the internal mechanism.
Figure 4:
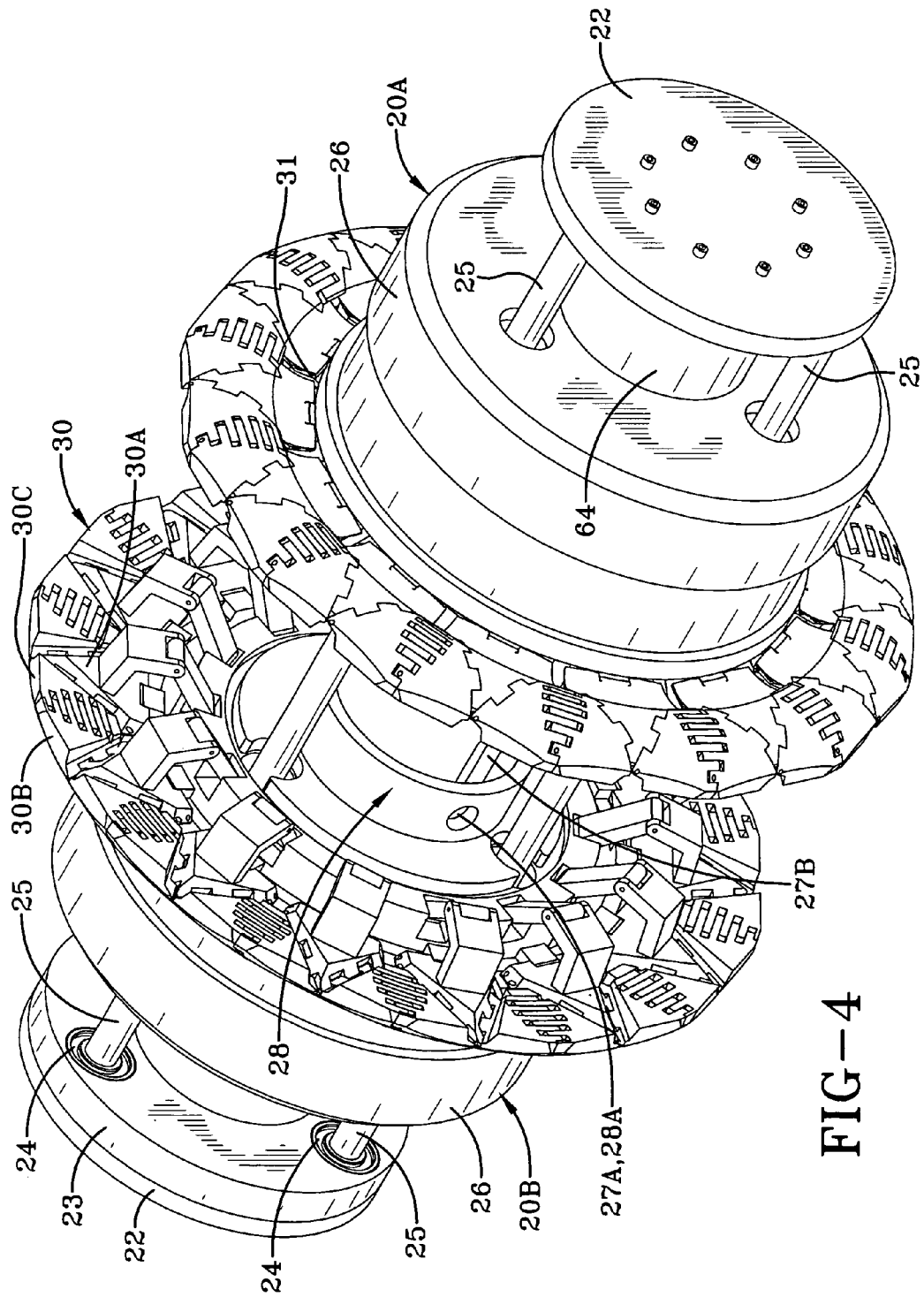
FIG. 4 is a third perspective view of the drum core assembly, it being understood that the inboard sidewall support assembly is identical to the outboard sidewall support assembly with the exception of being turned or facing in the opposite direction. In this view the collapsible annular sidewall supports are shown fully extended open.

With reference to FIGS. 3 and 4 the operation of the mechanism is now described. As the ends 26 are moved axially closer together the annular sidewall supports 30 start to move radially outwardly as the axial movement of the end supports 26 are brought closer together. As illustrated, the sidewall supports 20 include several hinged components 30a, 30b, 30c that are attached by pins 31. Each of these hinged components 30a, 30b, and 30c is capable of pivotally moving relative to the adjacent hinged component, As illustrated each of the hinged components 30a, 30b and 30c has a somewhat triangular shape and, in fact, have an arcuate curvature that will simulate the sidewall of the tire to be formed when in a fully opened or expanded radial position.

As illustrated in FIG. 3, the sidewall support mechanisms 30 start to raise from the fully collapsed position of FIG. 2 to the fully extended position of FIG. 4. As shown in FIG. 4 when the movement of the sidewall support mechanism 30 is completed the bead spacing is set for the appropriate tire being manufactured and the collapsible annular sidewall supports 30 are shown forming a complete annular ring as illustrated in FIG. 4, this annular ring provides a rigid support across the entire sides of the building drum. All this movement occurs in concert with the movement of the end supports 26 axially inwardly.

With reference to FIG. 5 the flexible reinforced annular cover 52 is illustrated over or covering the fully extended collapsible annular sidewall supports 30 illustrated in FIG. 4. In other words, the building drum assembly 50 as illustrated in FIG. 5 shows the position of the flexible member or cover 52 when the collapsible annular sidewall supports 30 are fully extended. This is the tire building mode. To remove the tire carcass from the drum assembly 50, one simply extends axially outward the two end supports 26. As the ends 26 move, the tire building drum 50 and the cover 52 are drawn radially inwardly as the end supports 26 move axially outwardly. In this position the collapsible sidewall supports 30 that are covered by the cover 52 are in the position shown in FIG. 3 and this is represented by the illustration shown in FIG. 6 wherein the cover 52 is concealing the collapsed annular sidewall supports 30.

Figure 6:
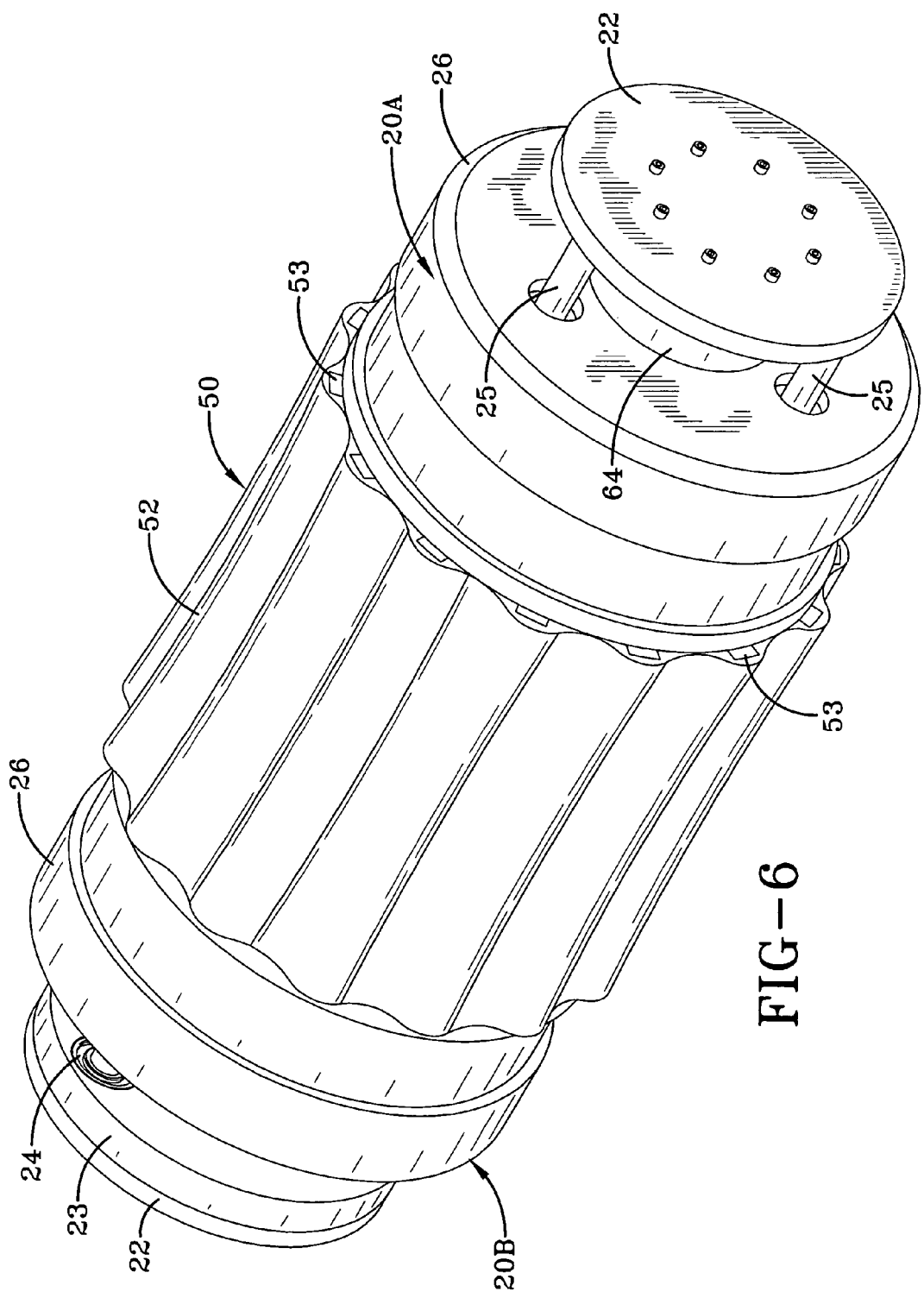
FIG. 6 is a perspective view of the radially expansible drum core according to the present invention having the expandable reinforced annular cover stretched and in the fully collapsed position.

The above tire building core permits the building of the tire carcass onto a toroidially expanded building drum assembly 50 by applying the carcass components onto a cover 52 of a toroidially expanded building drum core at a first diameter $D_1$ while rigidly supporting the sides 56 of the cover 52 with a pair of internal collapsible sidewall support mechanisms 30 to form the toroidially shaped uncured carcass. The reinforced expanded cover 52 can then be further expanded by an amount less than 5% greater than the diameter $D_1$ by applying an internal pressure to the expanded cover 52. This expanded cover 52 can then slightly grow in diameter at an amount less than 5% greater than the diameter $D_1$. After this additional growth in the cover 52 is achieved, one can simply add a belt reinforcing structure or tread belt reinforcing structure onto the expanded cover to form an uncured tire assembly which may further include the step of taking the entire uncured tire while mounted onto the drum assembly and placing that entire assembly into a tire curing mold and removing the cured tire assembly from the mold collapsing the toroidially expanded building drum core and removing the cured tire from the collapsed core. Alternatively, the method may involve the steps of collapsing the radially expanded building drum core and removing the formed uncured carcass from the collapsing building drum core without utilizing the building drum core in the tire curing mold. It is understood that the step of inflating the reinforced uncured tire assembly slightly during the building may be eliminated or may be conducted only when the entire assembly is placed in the curing mold. At that point additional pressure can be applied such that the cover 52 pushes against the uncured tire and forces it into the mold, all of this being achieved at a very minimal amount of increase in diameter. It is believed important that the uncured tire be assembled in a fashion that very closely approximate the curing dimensions. Having accomplished this, movements of the cords 2 and underlying reinforcing structures commonly found in tires can be greatly minimized. Once a tire is cured its cords are embedded into the cured rubber in such a fashion that they will not move. Current manufacturing of tires requires large amounts of expansion of the uncured rubber along with embedded reinforcing cords during various stages of the tire building. This is particularly true when tires are assembled on the flat cylindrical building drum and inflated into a toroidal shape. When this occurs, the reinforcing cords must stretch and expand as the movement radially outwardly is increased. The stretching movement of the cords changes the pitch and creates opportunities for non-uniformities to occur in the tire. By building the tire using the building drum 50 of the present invention the amount of stretch or change during tire building is greatly minimized. This ensures that the cords when placed onto the building drum remain in that position after cure or as close as possible to the as built condition once the tire is cured. It is an objective of the present invention to ensure that the cords are basically in almost the same position as they were applied before curing when the tire is finally cured. It is believed that the present invention provides a very efficient way to mold the tire in the as-built position without any distortion of the cords. As noted the overall tire building system is fully described in a related patent application Ser. No. 10/365,374, filed Feb. 11, 2003, entitled "An Improved Method and Apparatus For Manufacturing Carcass Plies For a Tire". That patent is incorporated herein by reference in its entirety. That patent discloses how cords can be laid at various angles including radial to build radial type tires, on a bias to build bias-type tires or, alternatively, to build on any cord angle that is not included in the general species of radial or bias including, but not limited to, geodesic type ply cord angles. The present building drum 50 provides a maximum amount of efficiency to build the tire in a superior fashion to those of the known prior art. It is important that the sidewalls have the necessary curvatures to duplicate the as-finished tire. It is believed that this provides a far superior way of building a tire. It is further believed important that the sidewalls should be rigidly supported during the tire building process. This greatly facilitates locating the components in a very precise manner. Across the crown area of the tire it is very important that the expandable cover 52 also be rigidly supported. It is therefore recommended that the expandable cover 52 be made out of a material that can provide limited expansion under pressure but also provide a very rigid support across the top member. As a result it is recommended that the cover be reinforced with support members 53 of either plates, rods or other mechanisms to provide a somewhat rigid crown area so that the ply components can be added without movement in this area. With reference to FIG. 6, one can see that the sidewall support mechanisms 30 internal of the cover 50 provide sufficient sidewall support while the support members 53 provide radial support when the cover 52 is fully expanded. The support members 53 are shown extending transversely across the cover 52 and embedded therein. Alternatively, the support members 53 can be positioned on a bias. However, this creates more problems when one tries to collapse the sidewall supports 30 in a fully retracted position for removal of the built and finished tire.

Figure 7:
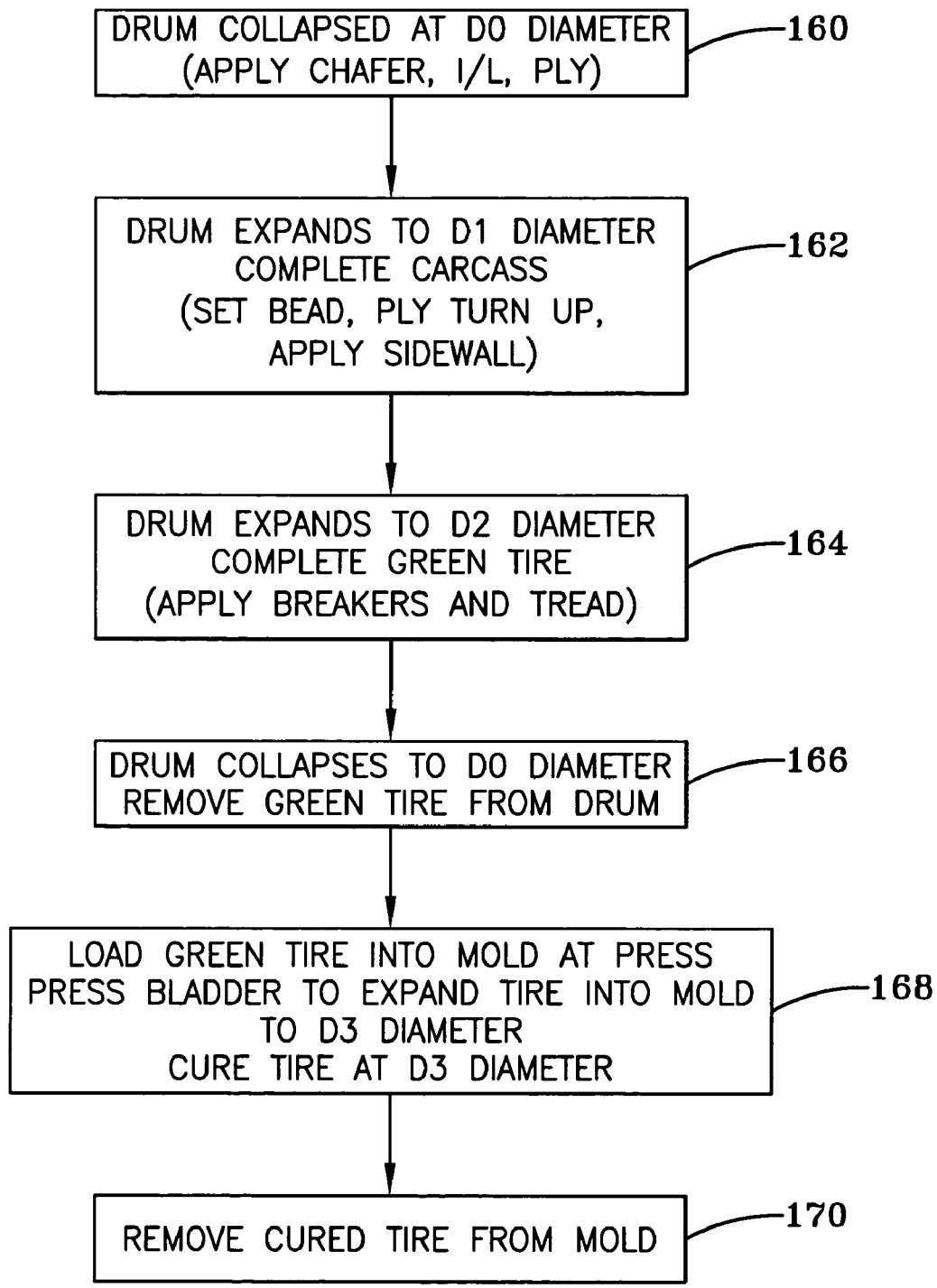
FIG. 7 is a block level diagram of a representative prior art method of forming tires.

Referring to FIG. 7, a method representative of prior art approaches for the forming of a tire is illustrated in a block level diagram for the purpose of illustration. The process is explained previously. As explained, the prior art method of changing the drum diameters from D0 through expanded diameters D1 and D2 in order to arrive at a finished tire diameter D3 acts to exaggerate any imperfections in the tire caused by imperfectly dimensioned tire component layers and/or imperfections caused by uneven drum expansion. Consequently, the prior art method of FIG. 7 is, to a greater than desired extent, uncontrolled as a result of variables in the carcass layer geometries and the less than perfect control over the expansion of the drum by the press bladder indicated at block 168. As a result, the prior art methodology may result in a finished tire having less than desired quality and uniformity.

Figure 8:
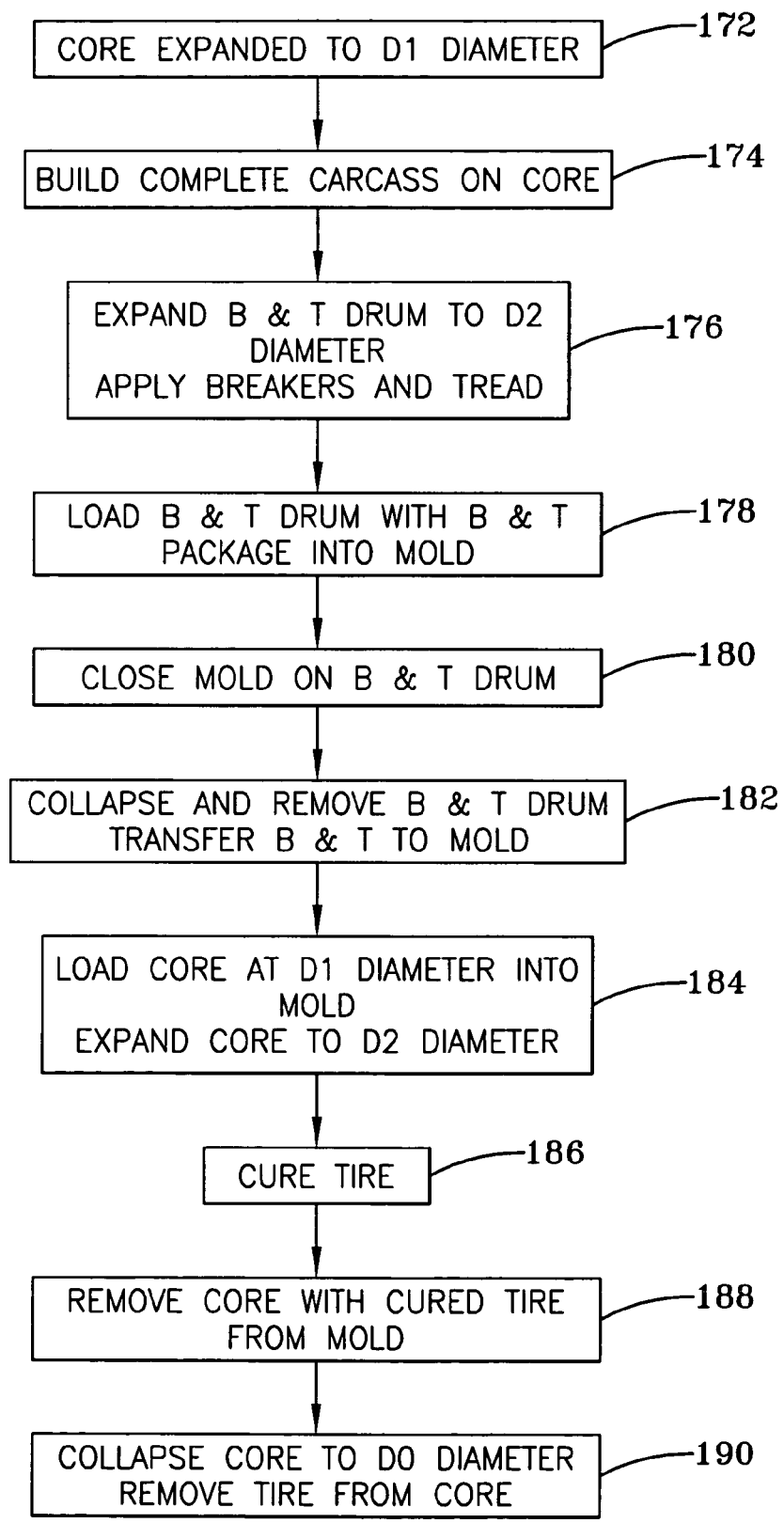
FIG. 8 is a block level diagram of the radially expansible tire drum method for forming tires pursuant to the invention.

As illustrated in FIG. 8, the subject invention method eliminates the uncontrolled bladder expansion of the green tire to the finished tire diameter D3. In so doing, a more uniform and geometrically controlled finished tire results. Specifically with reference to FIG. 8, the subject method is initiated by expanding 172 a tire building core from an initial D0 diameter to a first diameter D1. A complete carcass is built 174 on the core at core diameter D1. A separate breaker and tread drum is expanded 176 to a second diameter D2 and a breaker and tread package is applied to the breaker and tread drum at the second diameter D2. The breaker and tread drum with the breaker and tread package is then loaded 178 into a mold and the mold is closed 180 on the breaker and tread drum. The breaker and tread drum is collapsed and removed, transferring the breaker and tread package to the mold. The core at diameter D1 is then loaded into the mold and expanded 184 to the second diameter D2. After the tire is cured 186, the core with the cured tire is removed 188 from the mold. The core is collapsed 190 to diameter D0 and the tire removed from the core.

It will be understood that expanding the cover of the building drum core radially by an amount less than five (5) percent greater than $D_1$ is to a second outer diameter $D_2$ representing a final inner diameter of the tire carcass; and applying a belt reinforcing structure or a tread and belt reinforcing structure onto the carcass component on the cover is at the second outer diameter $D_2$.

From the foregoing, it will be appreciated that the subject invention method, unlike the prior art, does not use a bladder to expand the tire against the mold to diameter D3. Elimination of bladder expansion results in a more controllable process. Further, it will be appreciated that the mold in the present method is closed on the breaker and tread drum rather than the green tire being pressed into the mold by a bladder.

Closing the mold over the breaker and tread package mounted on the drum is a more controllable operation rather than a reliance (often misplaced) on the uniform expansion of a bladder.

It will further be noted that the subject method builds the complete carcass 74 on the core rather than building the carcass in a two stage 160, 162 construction that includes expansion of the drum diameter as taught in the prior art. Building the complete carcass on a core 174 allows for a more uniform completed carcass. Similarly, the invention method separately constructs the breaker and tread package on the drum at the finished diameter D2, and eliminates a final bladder expansion of the green tire, including the breaker and tread (B&T) package, to its final diameter D3 (step 168 in Prior Art FIG. 7). Building the breaker and tread package to a final diameter D2 apart from the construction of the carcass on a separate core 174, loading the B&T drum with the B&T package into the mold 178, removing the breaker and tread drum, loading the core into the mold and then expanding the core 184, is a much more efficient, less time consuming, process than that of the prior art. Moreover, as explained above, the invention process eliminates the variables associated with bladder expansion and final expansion of the green tire to final D3 diameter depicted at block 168 of the Prior Art FIG. 7 process. The invention further eliminates anomalies in cord spacing that might otherwise result from bladder expansion of the green uncured tire.

What is claimed is:

1. A method of building an uncured tire assembly onto a toroidally expanded building drum core, the method comprising the steps of:
    forming a toroidally shaped uncured tire carcass by applying the carcass components onto a cover of the toroidally expanded building drum core at a first diameter $D_1$, the first diameter $D_1$ of the cover dimensioned less than a final inner diameter of the tire carcass while rigidly supporting the sides of the cover with a pair of internal side support mechanisms;
    expanding the cover radially into an expanded cover by an amount less than five (5) percent greater than the diameter $D_1$; and
    subsequent to expanding the cover radially by an amount less than five (5) percent greater than the diameter $D_1$, applying a belt reinforcing structure or a tread and belt reinforcing structure onto the carcass component on the expanded cover to form an uncured tire assembly.

2. The method of claim 1 further comprising the step of:
    curing the uncured tire assembly in a tire curing mold;
    removing the cured tire assembly from the mold;
    collapsing the toroidally expanded building drum core; and
    removing the cured tire assembly from the collapsed core.

3. The method of claim 2 wherein the step of collapsing the toroidally expanded building drum core includes the steps of:
    axially increasing the spacing between the rigidly supported sides and radially lowering the internal side support mechanisms.

4. The method of claim 3 wherein the step of lowering the internal side support mechanisms includes the step of pivotally moving hinged elements of the internal side support mechanisms.

5. The method of claim 1, wherein expanding the cover of the building drum core radially by an amount less than five (5) percent greater than $D_1$ is to a second outer diameter $D_2$ representing a final inner diameter of the tire carcass; and
    applying a belt reinforcing structure or a tread and belt reinforcing structure onto the carcass component on the cover is at the second outer diameter $D_2$.

* * * * *